Dec. 15, 1925.  
W. F. DUGINS  
MACHINE FOR CUTTING METAL STRIPS  
Filed Feb. 27, 1924

1,566,082

Inventor  
William Francis Dugins  
By  
R. Singer, Atty.

Patented Dec. 15, 1925.

1,566,082

UNITED STATES PATENT OFFICE.

WILLIAM FRANCIS DUGINS, OF MELBOURNE, VICTORIA, AUSTRALIA.

MACHINE FOR CUTTING METAL STRIPS.

Application filed February 27, 1924. Serial No. 695,545.

*To all whom it may concern:*

Be it known that I, WILLIAM FRANCIS DUGINS, a subject of the King of Great Britain, residing at Carnegie, Melbourne, Victoria, Australia, have invented new and useful Improvements in Machines for Cutting Metal Strips, of which the following is a specification.

This invention relates to machines for cutting up metal sheets into narrow strips having wavy or fancy edges and which work has hitherto been done with machine dies or by hand.

According to this invention, however, the work is facilitated and strips cut with variously designed edges in my machine, in which is a shearing knife having a shaped or configurated edge corresponding to the design of strip required. Thus, if wavy edged strips are desired, the shearing knife will be corrugated. Further, the strips cut can be formed with a wavy or irregular edge on one side and a straight edge on the other or each edge can be waved. In the former instance the cut would be made along the middle of a rectangular plate twice the width of the strips to be cut.

In the accompanying drawings—

Figure 1:
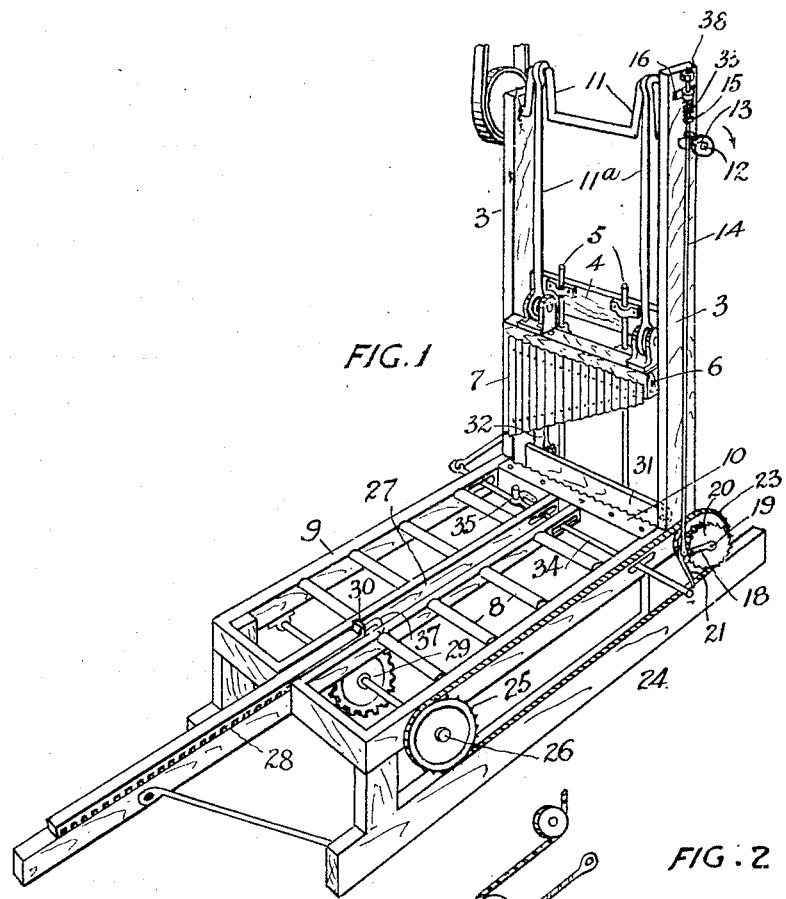

Fig. 1 is a perspective view of the machine, and

Figure 2:
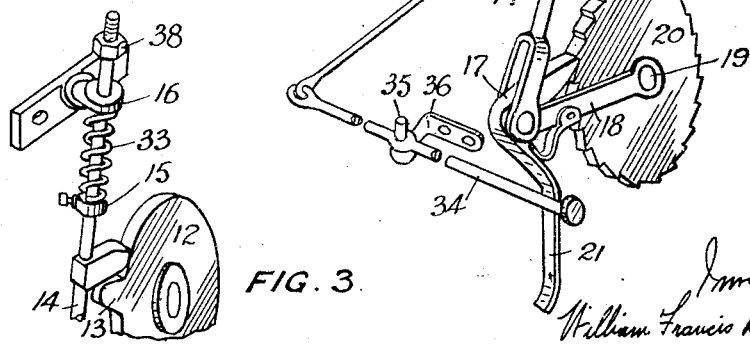

Fig. 2 a like view of the metal sheet feeding gear, and

Figure 3:
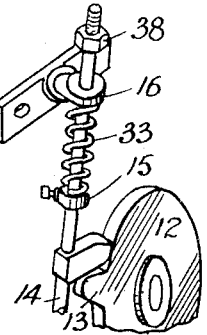

Fig. 3 illustrates in detail the feed timing gear.

In the frame 3 which is suitably stayed or reinforced by a cross piece 4 vertical rods 5 are supported and which serve as guides for the knife frame 6 to which the knife or shear 7 is securely attached. The shear is corrugated for the purpose of cutting wavy edged strips from the sheet that is placed on the rollers 8 on the table 9 on the forward edge of which is the complementary shearing plate 10.

The shear frame can be operated in various ways, such as by a hand lever, but in the drawing one way for mechanically reciprocating the shear is by a pair of cranks 11 and crank rods 11ª attached to the shear frame, driven from a belt and pulley, there being means, if desired, for shifting the belt on to a loose pulley, such as when the machine is to be stopped after a plate has been cut up. I have also shown a means for feeding the metal sheet forwards to the knife after each cut has been made. This consists of a disc 12 on the crank shaft and rotating therewith, the disc having a finger 13 on its periphery that, as the disc rotates, is adapted to contact with a projection on a connecting rod 14. On the said rod is a collar 15 above the projection and a compression spring 33 which seats on the collar and, in compression, bears against a bracket 16 on the machine frame 3 and through which the rod passes.

To lower the end of the rod 14 a pawl 17 is pivotally mounted in common with a distance lever 18 on a spindle 19. On said spindle is a ratchet wheel 20 in the teeth of which the pawl engages when the finger 13 on the disc 12 lifts the rod.

The pawl 17 is provided with a tail piece 21, for the purpose hereinafter explained, and with a spring 22, mounted on the lever 18, for keeping the pawl on the ratchet wheel. Also on the spindle 19 is a sprocket wheel 23 carrying a chain 24 that passes over another sprocket 25 on a spindle 26, transversely placed in the rearward part of the table or platform 9, in the medial part of which is a longitudinal groove or channel 27 and in which is accommodated a toothed rack 28 in which the spur wheel 29 on the spindle meshes. The plate to be parted is laid on the rollers 8 in the table and in front of and against the turned up end 30 on the rack 28 and after each cut by the shear 7 is finished and same is returned clear of the plate 10, the timing finger 13 operates to lift the rod 14 to rotate the ratchet 20. This in turn moves the chain to rotate spindle 26 and the spur pinion 29 to feed the rack and plate forwards.

If desired, an adjustable gauge plate 31 may be provided against which the plate is fed before being cut. This plate should be pivotally mounted at one end in the machine frame and at the other end is hung on a rod 32 on the shear frame. Thus, as each cut by the shear is made, the plate 31 will be carried down with it and, at the end of each cut or stroke, will be approximately parallel with the shear edge. The compression spring 33 will operate to return the rod 14 after each upward movement. The gauge plate will be more especially required if the machine is hand fed.

In the forward part of the table or platform 9 a transverse rod 34 passes through slotted members of the table frame. It is pivotally mounted on a pin 35 on a bracket 36 while one end projects from the table over and beyond the tail of the pawl 17 and the other is connected to a rod and connections with a belt shifting gear of the ordinary type. Projecting from the rack bar 28 is a downwardly depending finger 37 which, as the metal plate is fed forwards for the final cut, will impinge against the rod 34, rocking it on its support to press at one end upon the pawl tail 21 to throw the pawl out of gear with the ratchet 20 and at the other to operate the belt shifting means to move the belt on to a loose pulley, thus stopping the machine to permit of a fresh plate to be placed on the table, after the rack bar has been retired to about the position shown in the drawing. At the upper end of the rod 14 is a nut 38 which is adjusted to limit the downward movement of the rod relatively to the disc finger 13 and the ratchet pawl 17.

As the metal plate is fed forwards the wavy strips will be cut as the shear descends into the shearing plate 10 and will drop down out of the machine. The strips so made may be used in various ways, such as for attachment under the eaves of corrugated iron roofing to exclude birds or upon the edges of barn floors having corrugated iron walls to prevent the intrusion of mice and other vermin. Further, owing to the variety of designs possible the strips can be used in an ornamental way on fences; to cover the joints in fibrous cement sheets on buildings and in the interior decoration of dwellings.

Having now described my invention what I claim as new and desire to secure by Letters Patent is—

1. In a machine for cutting metal sheets into strips, a corrugated shear, means for reciprocating the same, a fixed shear plate on the machine table, and a gauge plate pivotally mounted in the machine frame at one end and hung on the shear frame at the other.

2. In a machine for cutting metal sheets into strips, in combination, a shear having an irregular edge, a shear plate on the machine table complementary thereto, a disc and a peripheral finger thereon mounted on the shear driving crank shaft, a connecting rod and a projection thereon adapted to be lifted by the finger, a pawl on the lower end of the rod, a ratchet wheel on a sprocket wheel spindle, a lever on the spindle supporting the pawl, means for communicating the rotary movements of the ratchet wheel to a spur pinion, a toothed rack medially and longitudinally placed in the machine table in mesh with the pinion and a turned up member on the forward end of the rack that pushes the metal sheet forwards under the shear after each cut.

3. In a machine for cutting metal sheets into strips having a shear with an irregular edge and ratchet gear for feeding the sheet forward after each cut through a toothed rack in the machine table, means for throwing out the feed gear when the sheet is cut up which comprises a tail piece on the ratchet pawl, a transverse bar pivotally mounted in the forward end of the machine table and projecting past the tail of the pawl, and a projection on the forward end of the toothed rack that contacts with the bar to rock it against said tail piece.

4. In a machine for cutting metal sheets into strips having a shear with a corrugated edge, ratchet gear and timing means for feeding the sheet to the shear, a connecting rod holding the ratchet pawl and a finger on the rod adapted to be lifted by a finger on a disc on the shear driving crank shaft, the provision of a collar on the rod above the said disc and finger, a compression spring on the rod above the finger, a bracket on the machine frame supporting the rod and a nut on the upper extremity of the same.

In testimony whereof I have signed my name to this specification.

WILLIAM FRANCIS DUGINS.